Patented July 5, 1938

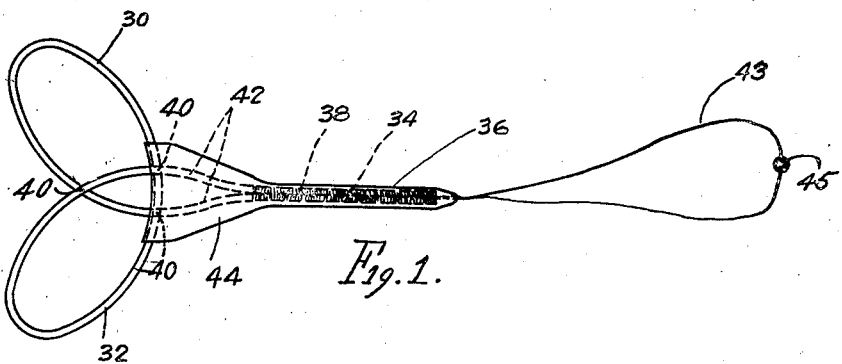
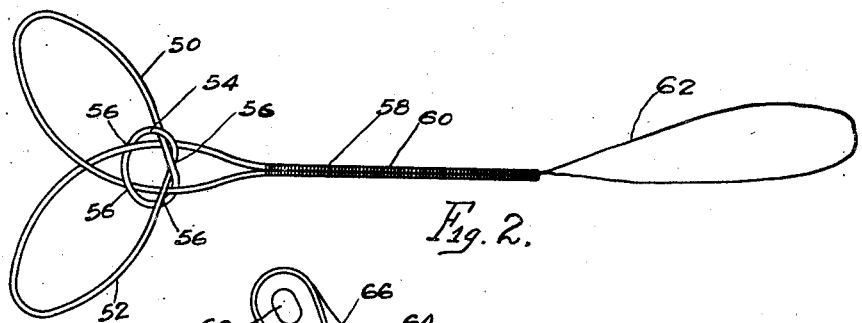
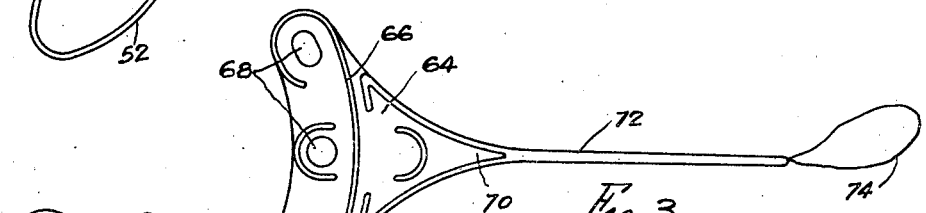
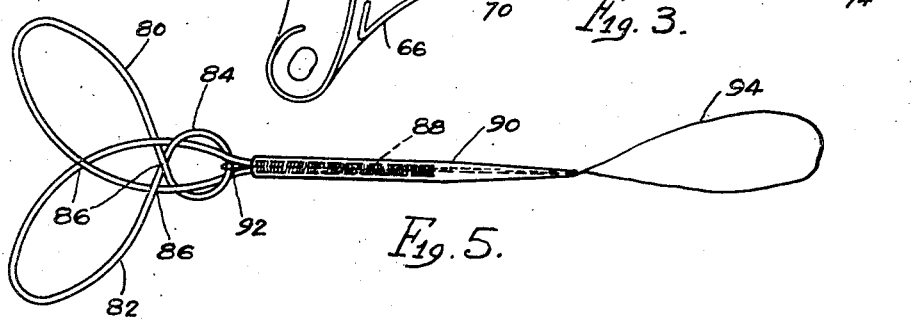
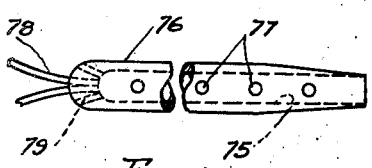

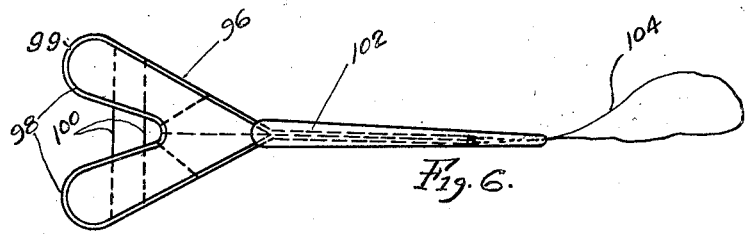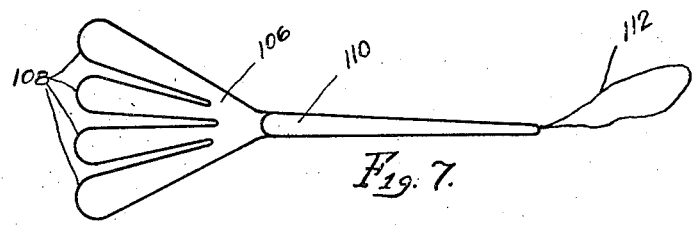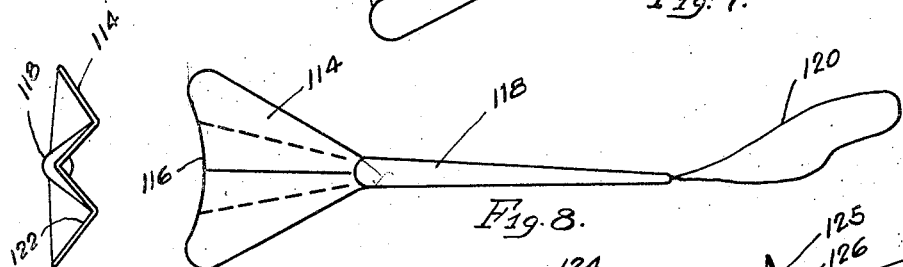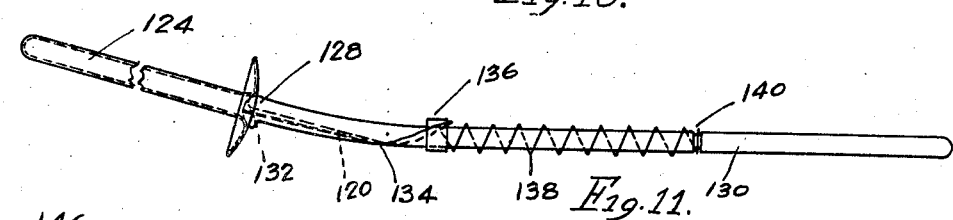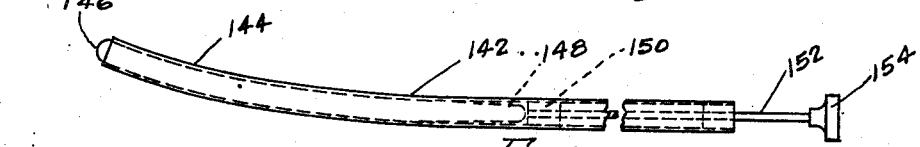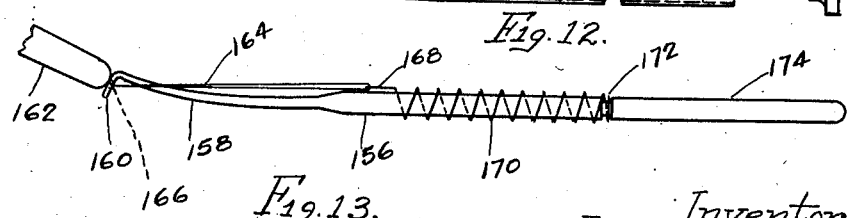

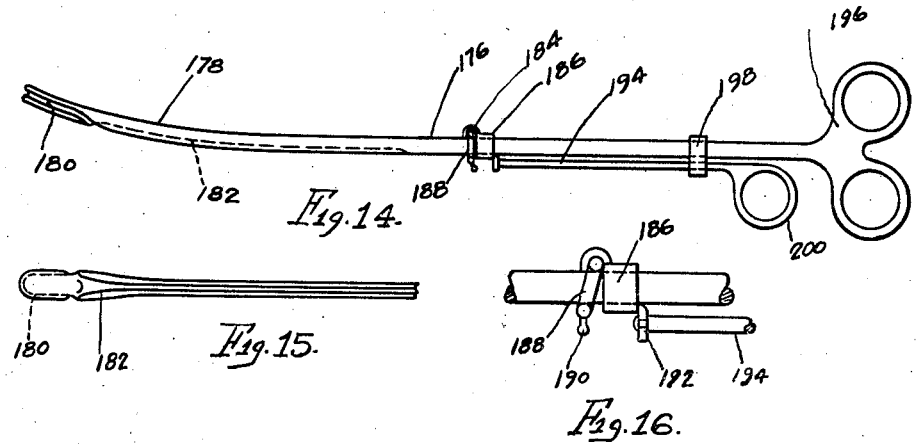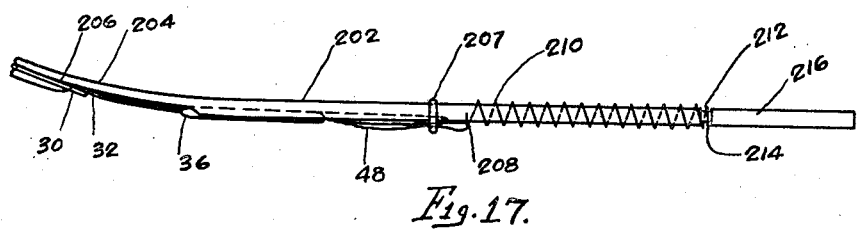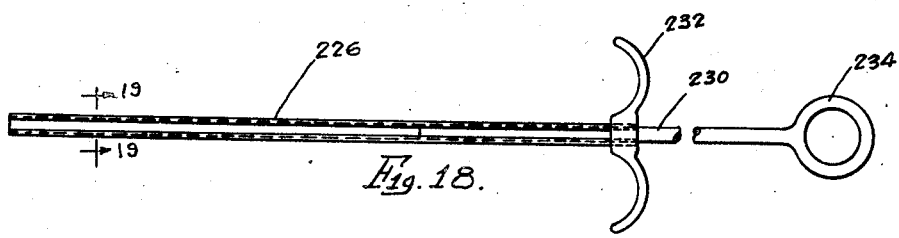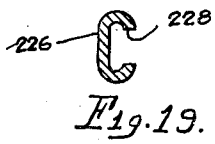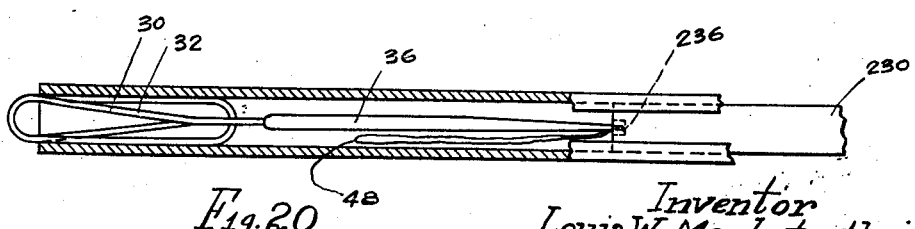

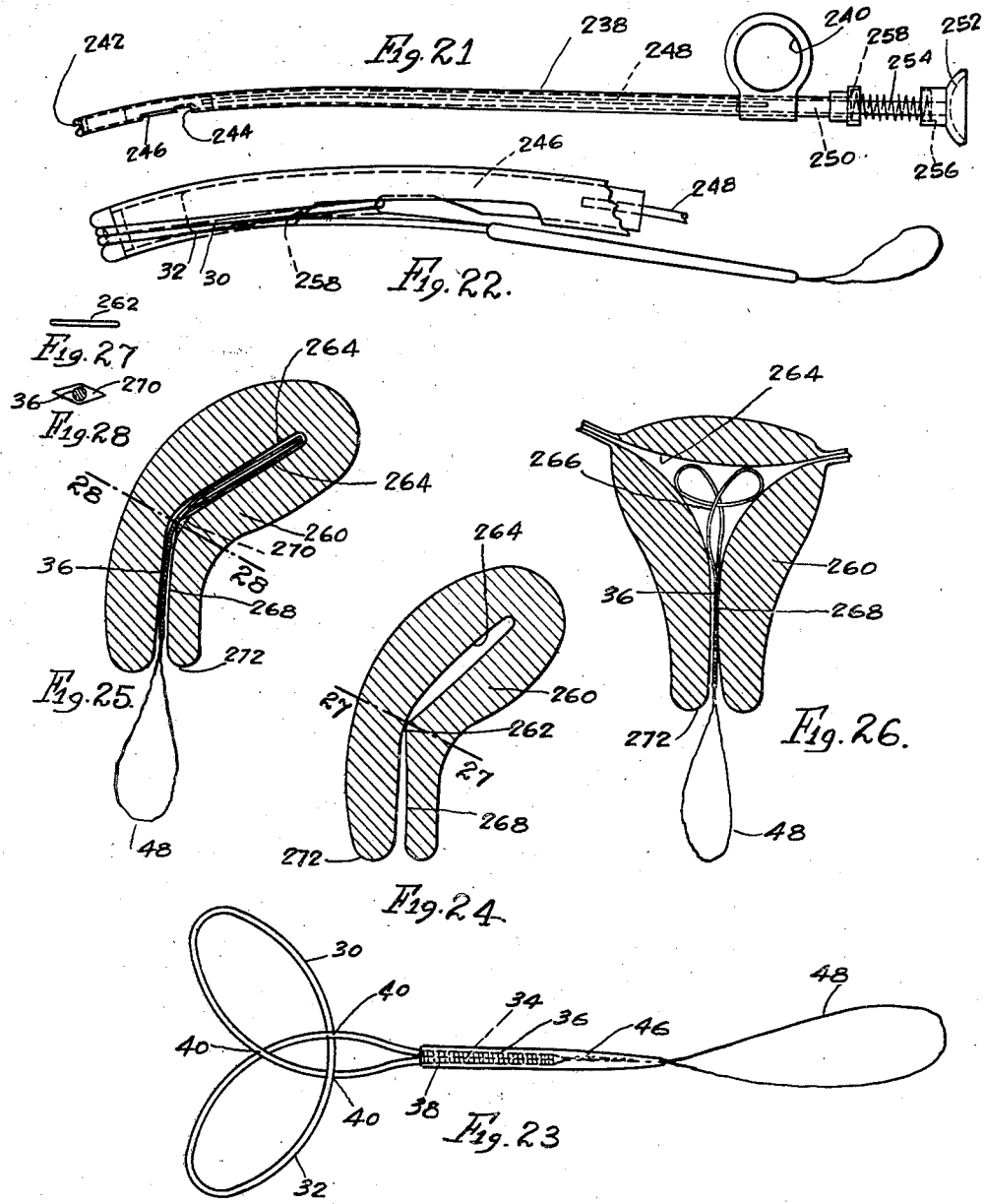

2,122,579

UNITED STATES PATENT OFFICE 2,122,579

INTRA-UTERINE DEVICE

Louis W. Meckstroth, Chicago, Ill.

Application June 13, 1934, Serial No. 730,411

18 Claims. (Cl. 128—130)

This invention pertains to anatomical devices, and more particularly to intra-uterine devices and capillary drains.

It is an object of this invention to provide a self-retaining capillary drain which readily accommodates itself to any cavity in which it is applied, and one which is comfortable to the patient and non-injurious.

Another object is to provide an intra-uterine device wherein there is little or no tendency nor likelihood of the device being expelled from the uterus.

Still another object is to provide an intra-uterine device which is readily and easily applicable to the uterus and retained in the uterus without any discomfort on the part of the patient.

Yet another object is to provide a non-irritating capillary drain adapted for use in any sinus for any pathological difficulty such as an abscess.

A further object is to provide an intra-uterine device which prevents matter foreign to normal secretions from remaining in the uterus.

A still further object is to provide an intra-uterine device which relieves dysmenorrhoea and amenorrhea, tending to normalize menstruation, and to correct causes of faulty menstruation, or lack of menstruation, and to prevent retention or stasis, and to help eliminate pathological secretions as well as normal secretions of the uterus.

A yet further object is to provide an intra-uterine device and an introducer therefor which may readily serve the function of a sound.

Another further object is to provide an intra-uterine device or capillary drain which is sufficiently stiff and rigid to maintain its approximate shape under the pressure, warmth and moisture of the uterine cavity, yet is sufficiently pliable to adapt itself to the conformation of the cavity walls without resistance and injury to the tissues.

A different object is to provide an intra-uterine device which, while readily introducible with a proper instrument by a competent physician or one skilled in the art yet, once applied, is effective and may be retained in the uterus without injury or discomfort to the uterus for an appreciable time and in no wise interfering with the normal functions in the adjacent vagina, the device being readily removed by anyone, such as the patient.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figures 1 to 3 inclusive, are enlarged plan views of various forms of a device embodying the invention;

Figure 4 is an enlarged fragmentary side elevation of a portion of one form of the device embodying the invention;

Figures 5 to 8 inclusive, are enlarged plan views of other forms of the device embodying the invention;

Figure 9 is an end elevation of the head of the device illustrated in Figure 8, the same showing said head in a partly collapsed condition;

Figure 10 is an elevation showing the device encased in a gelatinous substance whereby a suppository is formed;

Figure 11 is an elevation showing the assembly of a suppository form of the device and one form of introducer;

Figure 12 is an elevation showing the assembly of a different form of introducer with a different form of suppository;

Figure 13 is an elevation of yet another form of introducer;

Figure 14 is a side elevation of yet another form of introducer;

Figure 15 is a top plan view of the introducer illustrated in Figure 14;

Figure 16 is an enlarged side elevation of the latching means provided on the introducer illustrated in Figure 14;

Figure 17 is a side elevation of yet another form of introducer showing a form of the device assembled therewith for introduction;

Figure 18 is a top plan view of yet another modified form of introducer;

Figure 19 is an enlarged sectional elevation taken substantially in the plane as indicated by the line 19—19 of Figure 18;

Figure 20 is an enlarged top plan view partly in section of the introducer illustrated in Figures 18 and 19 illustrating one form of drain in assembled relation therewith;

Figure 21 is a side elevation of another modified form of introducer;

Figure 22 is an enlarged fragmentary side elevation of the introducer illustrated in Figure 21 showing a form of the drain in assembled relation therewith;

Figure 23 is an enlarged plan of yet another modified form of the device embodying the invention;

Figure 24 is a sectional elevation of a uterus illustrating a stricture or flexion;

Figure 25 is a sectional elevation of a uterus illustrating the application thereto of an intrauterine device embodying the invention;

Figure 26 is a sectional elevation of a uterus taken longitudinally of the uterine cavity illustrating the application thereto of an intra-uterine device;

Figure 27 is an enlarged sectional elevation taken substantially in the plane as indicated by the line 27—27 of Figure 24 showing the general shape of the cervical canal at the flexion;

Figure 28 is an enlarged sectional elevation taken substantially in the plane as indicated by the line 28—28 of Figure 25 showing the correction of the flexion by the application of the device to the cervical canal.

The drains or intra-uterine devices illustrated herein consist essentially of a head, an appendage thereto, and withdrawal means such as a thread preferably looped and secured to said appendage, the parts forming a capillary drain assembly. The head is preferably made of a pliable or flaccid non-metallic material such as silkworm gut, medicated rubber or fiber, and, where a filament construction such as illustrated in Figures 1, 2, 5 and 23, is formed of a single elongated member as illustrated in Figures 1 and 23, said head is formed to provide a pair of loops 30 and 32, the ends 34 of the filament terminating in the appendage portion 36, said ends preferably being wound with silk thread 38 to retain the shape of the device, the filament being interlaced as at 40 to form the proper lobes 30 and 32.

In the form of device wherein the head is made of a filament, this filament is preferably made of silk worm gut medicated and of such size and material that it becomes flaccid when brought in the presence of high temperatures or fluids such as body fluids. With this form of head it will conform to the shape of the opening or cavity into which it is inserted, and will lie therein without exerting irritating pressure on the sides of the cavity, yet where applied to the body as in the uterus it cannot be expelled by the normal working of the uterus or other members. Thus it comfortably performs its intended function.

In the form of the device illustrated in Figure 1, a portion 42 of the filament is molded into a rubber or other pliable sheath 44 extending substantially the length of the appendage or stem 36. The end of the appendage is provided with the withdrawal loop 43 which may or may not be provided with the bead 45 for facilitating the withdrawal of the device. In place of the bead a knot or a series of knots may be put in the loop 43, or a knotted spring may be used for withdrawal so that the string may be cut off at any knot whereby the length will not be too great for any vagina.

In the construction illustrated in Figure 23, the appendage is provided with a rubber sheath or coating 46, the end thereof being tapered, and the withdrawal thread 48 is secured within said portion as to the appendage 36. It is to be understood that in this and other modifications the stem may be covered with gold leaf or any medicated substance.

In the construction illustrated in Figure 2, lobes 50 and 52 are provided by the filament, and an additional loop 54 in the lacing 56 is provided to increase the spring action of the lobes to cause them to move outwardly away from each other. In this modification the lacing 54 is removed or spaced from the appendage 58 which is provided with the wrapping 60 and the withdrawal cord 62. In this case it is of course appreciated that a pliable sheathing may encase the wrapped portion 60.

In the construction illustrated in Figure 3, the whole device is molded of a pliable material and includes the head 64 substantially of triangular shape having the reenforcing ribs 66 and the apertures 68, the head terminating at the apex 70 into the appendage 72 having the withdrawal loops 74 secured thereto.

Figure 4 shows an enlarged view of an appendage 76 provided with the filament head 78 of the desired loops, said appendage being hollow as at 75 and having apertures 77 and channels 79 provided to permit the introduction of medication through the appendages to the cervical canal and cavity where the device is applied to the uterus.

In the construction illustrated in Figure 5, the lobes 80 and 82 are provided with a different form of loop 84, the lobes and loop being laced as at 86, the stem 88 in this instance being shown having a pliable tapered casing 90, the wrapping on the stem 88 forming a securing means 92 for the loop 84, and the withdrawal thread 94 being provided at the tapered end of the stem.

In the construction illustrated in Figure 6, the head 96 is made of pliable material such as medicated fiber or rubber, and is generally fan or heart shaped providing the pair of spaced lobes 98, which may be ribbed as at 99, said lobes being connected by the threads 100 whereby substantially a grid is provided the threads being molded into the head to secure them as shown by the dotted lines. The apex of the head is secured to the pliable appendage 102 which is tapered toward its end and provided with the withdrawal thread 104.

In the construction shown in Figure 7, the head 106 is likewise substantially fan shape in plan and is made of a pliable molded substance, being provided with the series of spaced flat lobes 108, the apex of the head being provided with the tapered appendage 110 provided with the withdrawal thread 112.

In the construction shown in Figures 8 and 9, the head 114 is made of pliable molded material and is substantially triangularly shaped, the base 116 thereof being shaped to conform substantially to the shape of the fundus (of the uterus) whereby the base is substantially concave. The apex of the head is provided with the tapered appendage 118, said appenage being provided with the withdrawal cord 120. The head, in this form of the device, may be collapsed in channels 122 and rolled whereby the head and appendage may be encased in a gelatinous readily meltable material whereby an elongated suppositary 124 may be provided as illustrated in Figure 10, the end thereof being formed with the head 125 provided with the cavity 126, the thread 129 being allowed to be free. The cavity 126 is adapted to form a socket for the rounded end portion 128 of the introducer 130 shown in Figure 11.

The end of the introducer may be curved or shaped as desired. The end 128 is channeled or notched as at 132 for permitting the passage of the loop 120 along the introducer where it is crossed at 134 and retained by means of the slidable and rotatable latch member 136 normally retracted by means of the contractile spring 138, the end of the spring being provided with the member 140 through which the spring may be rotated. In using this form of the device, after the suppository 124 has been applied, as for example into the uterus, rotation of the latch member 136 is effected by rotation of the member 140, causing rotation of the spring 138 to thus rotate the member 136 whereby the loop is released, permitting withdrawal of the introducer from the vagina and leaving the suppository in position in the uterus where, after melting, the head will spread to lie in the uterine cavity.

The introducer device illustrated in Figure 12 comprises a tube 142 the end of which, 144, is properly curved for ready operation as for example ready insertion into the cervical canal. In this form of the device the suppository casing 146 is provided with no head or end portion, as shown at 124 in Figure 10. The casing is substantially tapered, the withdrawal cord 148 either being entirely encased, or merely a portion thereof projecting from the casing. The suppository is retained in the tube such as illustrated in Figure 12, and is expelled by means of the plunger 150, the operating rod 152 therefor extending from the outer end of the tube and provided with the operating button 154. In operation of this form of introducer, it is merely necessary to move the plunger 150 toward the end 144 of the introducer whereupon the suppository is moved outwardly to expel the suppository.

In the form of the device illustrated in Figure 13, the introducer comprises the elongated rod 156 the end of which is properly curved at 158 and is provided with the end ring 160. In this case the suppository 162 containing the drain must be provided with a sufficiently long withdrawal loop 164 whereby it can be passed through the aperture 166 of the loop 160 and be retained by the latch member 168. The latch member is provided with the contractile spring 170 secured to the operating means 172 rotatably mounted on the rod adjacent the handle 174 thereof, but incapable of longitudinal movement on the rod. In order to release the suppository it is only necessary to rotate member 172 whereby the latch 168 releases the member 164 whereupon the introducer may be withdrawn to leave the suppository in operative position in the cavity in which the drain is applied.

In the form of introducer illustrated in Figures 14 to 16 inclusive, the elongated body portion 176 is properly curved at the end 178 thereof, the end being provided with the channel 180 extending around said head and communicating with an elongated channel 182 provided on the underside or convex side of the introducer and extending rearwardly to a point adjacent the latch 184. In this case the latch includes the slidable sleeve 186 provided with the pivotally mounted latching ring 188, said sleeve and ring embracing the elongated body portion 178, the ring being provided with the latching pin 190. The sleeve is connected as at 192 to the reciprocating operating rod 194 extending toward the handle 196, being slidably retained in the guide 198 and provided with the operating handle 200. This particular form of introducer is adapted for the filament type of device, for example, that illustrated in Figure 23. In operating this form of introducer the lobes of the head of the drain device are compressed whereby the lobes 30 and 32 are each looped around the head of the introducer to lie in the channel 180. The appendage 46 then extends back into and lies in the channel 182, whereupon the end loop 48 can be engaged by the latching pin 190. The pin is of slightly larger diameter than the body portion 176 of the introducer so that when the operating rod 194 is retracted toward the handle 196, the loop 48 being in engagement with the pin 190, the drain device will cause a wedging action of the ring 188 on the body portion 176 so that the drain is retained in position on the introducer for ready release after introduction of the end of the introducer which carries the drain into the uterine cavity. It is then only necessary to move the operating rod 194 toward the end of the introducer, whereupon the latch ring will be permitted to be freed of its wedging action and the filaments tending to expand to assume their position such as illustrated in Figure 23, will permit release of the drain from the introducer, whereupon the introducer may be withdrawn from the vagina leaving the drain in the uterus with the loop 48 extending into the vagina.

In the form of introducer illustrated in Figure 17, the elongated body portion 202 is provided with the properly curved end 204 provided with the channeled portion 206 at the end thereof for the reception of the lobes 30—32 of the device, the end therefor being similar to that illustrated in Figures 14 to 16 inclusive. The appendage 36 is adapted to engage and lay along the body portion of the introducer, and the withdrawal loop 48 is adapted to extend from the appendage through a slidable or stationary but not rotatable guide or release member 207 to the hooked end 208 of the contractile spring 210, the contractile spring thus maintaining elongation of the lobe end whereby the drain is ready for application. The opposite end of the contractile spring is revolubly secured as at 212 in the retaining groove 214 adjacent the handle 216 of the introducer. Thus, after the introducer has been inserted, as for example, in a sinus, and it is desired to release the drain, it is only necessary to rotate the spring 210 as at 212, causing the hooked end of the spring 210 to release the loop 48 of the drain, as the loop cannot follow the spring, being prevented by member 207, whereupon the natural spring of the lobes causes disengagement from the end of the introducer, whereupon the introducer may be withdrawn from the sinus leaving the drain in operative position therein.

In the form of introducer illustrated in Figures 18 to 20 inclusive, the retaining body portion 226 is substantially channel shaped in section, the introducing end thereof being properly curved, the channel being so formed as to provide inwardly extended facing flanges 228 for the reception of the plunger 230 slidably mounted therein, the end of the channel being provided with the spaced finger or handle hold 232. The end of the plunger is likewise provided with any convenient operating means such as the finger hold 234. In this form of introducer the drain, as illustrated in Figure 23, is adapted to be received substantially wholly within the channel, the lobes 30 and 32 being aligned and elongated and the appendage 36 extending inwardly and preferably receivable in a seat 236 formed in the end of the plunger, the withdrawal loop 48 being adapted to lie in the channel. The channel is provided either on the concave side of the introducer, or on the convex side thereof. In the use of this species of introducer the appendage is preferably substantially a stiff one, which has an advantage in that the introducer need not be inserted to the fundus of the uterus, which might be necessary where a limber appendage is used. In expelling the device it is only necessary to move the plunger 230 outwardly toward the end of the introducer sufficiently to expel the lobes 30 and 32, the expansion of which, to fit within the uterine cavity, would be sufficient to withdraw the appendage from the introducer.

In the form of introducer illustrated in Figures 21 and 22, the outer tubular member 238 is provided adjacent the inner end thereof with the finger hold 240, the opposite end preferably being curved to permit its proper application, the outer end of the tube being provided with the seat 242. On the concave side of the device and adjacent the end there is provided a slot 244 in which a latch 246 is slidably mounted, the latch having a flexible member 248 secured thereto, which member may be a convenient Bowden wire, the inner end of said flexible member 248 being secured to the slidable rod 250 mounted in and projecting beyond the end of the tubular member 238 and provided with the operating head 252. An expansion spring 254 is mounted between a suitable seat 256 provided on the head and the seat 258 provided on the tube 238, the spring normally causing the latch to be urged away from the seat 242.

In applying a drain such as illustrated in Figure 23, the lobes 30—32 are again aligned and are engaged by the latch 246, movement of the spring serving to maintain the drain in operative position on the introducer. In order to release the drain it is only necessary to move the operating head 252 toward the seat 258 against action of the spring 254. Movement of the latch will cause the sloping shoulder 258 to release the head of the drain as the normal spring action of the lobes tends to make them assume the position shown in Figure 23, whereupon the introducer may be remove from the device.

As a matter of convenience the introducers may have indicia thereon whereby a sound is provided so that the physician may readily determine the size of a cavity to which the drain is to be applied.

In some instances the uterus 260 may have a flexion or stricture 262 adjacent the cavity 264 such as shown in Figure 24, in which case the device such as shown in Figure 23 may be inserted into the cavity, assuming the position as shown at 266 in Figures 25 and 26. The appendage 36 lying in the cervical canal 268 serves to correct this flexion, causing a normal opening such as shown in the dotted lines 270 in Figure 25.

To further illustrate the function of the drain at 262 in Figure 27, there is shown an enlarged view of the constriction of the uterus at the flexion taken in the plane 27—27 of Figure 24. This flexion causes menstrual and other difficulties. When the drain is applied as shown in Figures 25 and 26, this condition is corrected as further illustrated at 270 in Figure 28, which is a view taken in the plane 28—28 of Figure 25.

Figures 25 and 26 also show how the withdrawal loop extends outwardly of the cervix 272 where it will lie in the vagina and thus render the device readily accessible for withdrawal when it is to be removed for any reason such as to be renewed.

From the above it will be appreciated that there is provided a self-retaining drain designed for the drainage of cavities, particularly those with a narrow outlet, such as abscess cavities, natural anatomical cavities and hollow organs, which require drainage to counteract infection, obstruction or accumulation of fluid and tissue cells.

The ordinary abscess cavity is formed by a collection of pus in the tissues and is lined with cellular elements. The natural anatomical cavities, such as nasal sinuses, and cavities of hollow organs, as the uterus, bladder, and kidney pelvis, are also subject to pus infection and are an illustration of such infection in pre-formed natural cavities lined wtih a mucous membrane, which membrane becomes engorged and thickened with enlarged blood vessels, and infiltrated and covered with red granular cells, which if allowed to continue eventually result in scar tissue, with destruction of the normal mucous membrane.

The self-retaining drain herein described is suitable to the correction of these conditions by virtue of its self-retention over long period without injury, facility of medication and drainage, controlling infection and engorgement, the damming back of fluids, and the growth of cellular tissue within or on the mucous membrane or abscessed wall.

The head or self-retaining member as indicated is made of a shape, size, material and form to properly fit the cavity for which it is intended and to conform to such cavity by its yielding, pliable nature, without harmful pressure, but of a construction to become surrounded by, or to penetrate, accumulations of soft cellular tissue which it is desirable to remove, by causing canalization and fragmentation, designated as filament canalization and fragmentation, and giving entrance to body fluids which digest and liquefy and make for ready drainage. When the head of the device is subjected to body fluids it loses its initial resilience and becomes flaccid or plastic to the extent that it exerts no pressure but retains its shape sufficiently to remain in position, and cannot be expelled by the action of the uterus such as would occur if a mere single thread were used, or the device could assume a single elongated dimension.

Attached to or continuous with the retaining member, is a drain portion or appendage of a size and length to suit the individual case and to occupy the narrower outlet of the cavity. The appendage may be solid or hollow and it may have an opening or openings at the proper places for the introduction of medication, without removal of the entire drain device.

While the device may be made in various dimensions, forms, shapes, multiplicity of parts, etc., hollow or solid drain, it is convenient to describe it, as applying to the uterus, as covering its general application and also some special applications peculiar to the uterus, having to do with control and relief of certain menstrual disorders in which the normal physiologic processes in the mucous membrane of the uterus (menstrual membrane) closely imitate the conditions of infection as described. These changes constitute a menstrual cycle and consist of a post-menstrual period of healing and rest followed in succession by congestive conditions of the blood vessels, thickening, engorgement, and deposit of cellular tissue and finally digestion, liquefaction, ex-foliation and shedding of these products, accompanied by bleeding and constituting the menstrual period, the conclusion of which marks the end of the cycle, all of which resembles an automatic self-healing, inflammatory or infective process.

This cycle of events is usually without symptoms. Some of the exceptions which call for relief are amenable to correction by this device on a principle similar to that in infections. These conditions are (1) dysmenorrhea (painful menstruation), (2) amenorrhea (absence of menstruation), (3) prolonged menstrual cycles (deferred menstrual periods). Dysmenorrhea is relieved by filament canalization and fragmentation, self-digestion and liquefaction and ex-foliation of tissue cells and menstrual membrane, drainage, and the correction of obstructive conditions. Amenorrhea and prolonged menstrual cycles are relieved first by the activating presence of the filament member, promoting normal activity of a sluggish mucous membrane, and later encouraging ex-foliation and menstruation by filament canalization and fragmentation of the soft, cellular intra-uterine material, with resultant auto-digestion, liquefaction and easy expulsion.

Inflammatory and infectious conditions are characterized by similar phenomena of those of the menstrual cycle with the exception that they are caused by infection from pathogenic or disease producing germs, and besides congestion, swelling, and thickening of the mucous membrane and deposit of cellular tissue, there is a free accumulation of pus and mucous which requires drainage and medication for its relief and cure.

The function of the drain is the same in each of the above cases, namely, self-retention, fragmentation and canalization of cellular deposits, drainage, relief of obstruction, and relief of accumulations of pus and mucus, and medication.

This description can also apply by analogy to the conditions of infection of other hollow organ cavities, natural anatomical cavities, and tissue abscesses.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a device of the character described, the combination of a head of flaccid material adapted to accommodate itself to body tissues, an appendage secured to said head and substantially diminishing in size from said head to permit unrestricted passage past said appendage, and flexible means secured to said appendage for extracting said device from the body.

2. In a device of the character described, the combination of a head substantially the shape of the uterine cavity and formed of pliable nonmetallic material adapted to accommodate itself to body tissues, an appendage secured to said head and substantially diminishing in size from said head to permit unrestricted passage past said appendage, and flexible means secured to said appendage for extracting said device from the body.

3. An intra-uterine device including a looped pliable head adapted to accommodate itself to the cavity walls of the uterus, and a relatively stiff appendage portion connected to said head and adapted to lie in the cervical canal and substantially diminishing in size from said head to permit unrestricted passage past said appendage.

4. An intra-uterine device including a looped pliable head adapted to accommodate itself to the cavity walls of the uterus, a relatively stiff appendage portion connected to said head adapted to lie in the cervical canal and substantially diminishing in size from said head to permit unrestricted passage past said appendage, and flexible means attached to said appendage and adapted to lie in the vagina to form withdrawing means for said device.

5. A substantially pliable intra-uterine device including a head comprising a loop, and an appendage secured to said head and substantially diminishing in size from said head to permit unrestricted passage past said appendage.

6. An intra-uterine device including a head comprising a plurality of looped portions, and an appendage secured to said head and substantially diminishing in size from said head to permit unrestricted passage past said appendage.

7. An intra-uterine device including a head comprising a plurality of normally spaced divergent looped portions, an appendage secured to said head, and a loop interposed between said first named loops and said appendage and spaced from said appendage.

8. An intra-uterine device including a head comprising a plurality of normally spaced divergent looped portions, an appendage secured to said head, and a loop interposed between said first named loops and said appendage disposed adjacent and secured to said appendage.

9. An intra-uterine device including a substantially fan shaped pliable head of sheet-like material and an appendage secured to said head.

10. An intra-uterine device including a substantially fan shaped channeled pliable head of sheet-like material and an appendage secured to said head.

11. An intra-uterine device including a substantially fan shaped pliable head of sheet-like material formed by spaced panels joined adjacent an apex of said head, and an appendage secured to said head adjacent said apex.

12. An intra-uterine device including a pliable head having normally spaced divergent lobes, an appendage connected to said head, and a thread connecting said lobes.

13. An intra-uterine device including a pliable head formed of a filament formed to provide spaced lobes, an appendange connected to said filament opposite the space between the lobes, a connection between said filament and said appendage, and a connection across said lobes.

14. An intra-uterine device including a pliable head formed of a filament formed to provide spaced lobes, an appendage connected to said filament opposite the space between the lobes, a connection between said filament and said appendage, and a connection between said lobes whereby substantially a grid is formed.

15. An intra-uterine device comprising a pliable head, an appendage secured thereto, a meltable casing, said head and appendage being adapted to be encased in said meltable casing whereby said device is applicable as a suppository, said casing having a portion formed to receive applying means.

16. In a device of the character described, the combination of a threadlike looped head adapted to be inserted in the uterine cavity, an elongated appendage secured to the end of said head and adapted to lie in the cervical canal, and flexible withdrawal means connected to said appendage and adapted to lie in the vagina, said appendage and said withdrawal means permitting passage through said cervical canal.

17. An intra-uterine device having a head adapted to be inserted in the uterine cavity and an appendage adapted to lie in the cervical canal, said head being made of a filament formed into a plurality of loops interlaced to provide lobes which are adapted to lie towards the opposite ends of the fundus of the uterus.

18. In a device of the character described, the combination of a head, said head being made of a filament formed into a plurality of loops interlaced to constitute a plurality of lobes, said head being adapted to be inserted in the uterine cavity and the lobes to lie toward the apices of the fundus, an elongated appendage secured to the ends of said head and adapted to lie in the cervical canal, and flexible withdrawal means connected to said appendage and adapted to lie in the vagina, said appendage and said withdrawal means permitting passage through said cervical canal.

LOUIS W. MECKSTROTH.